United States Patent Office 3,557,154
Patented Jan. 19, 1971

3,557,154
SUBSTITUTED 1,4,5-TRIAMINO-8-HYDROXY-
ANTHRAQUINONE DYES
Rutger Neeff and Wilhelm Gohrbandt, Leverkusen, and Robert Kuth, Cologne-Muengersdorf, Germany, assignors to Farbenfabriken Bayer Aktiengesellschaft, Leverkusen, Germany, a corporation of Germany
No Drawing. Continuation-in-part of application Ser. No. 444,026, Mar. 30, 1965. This application July 29, 1966, Ser. No. 568,740
Claims priority, application Germany, Aug. 7, 1965, F 46,842
Int. Cl. C09b 1/50, 1/52, 1/56
U.S. Cl. 260—373          5 Claims

ABSTRACT OF THE DISCLOSURE 1,4,5-triamino-8-hydroxy anthraquinone dyestuffs for polyesters and polyamides containing substituted 2 and/or 3 position wherein one of said positions contains a substituent selected from the group consisting of substituted or unsubstituted alkyl, aryl, and aralkyl groups linked to the anthroquinone nucleus through a bridge selected from the group consisting of O, S, SO, and $SO_2$, are prepared by reacting a cyclic sulfamide or cyclic sulfimide ester with sulphur in oleum.

This application is a continuation-in-part of our copending application, Ser. No. 444,026, filed Mar. 30, 1965, for New Dyestuffs.

It has been found that substituted 1.4.5-triamino-8-hydroxy-anthraquinone dyes are obtained when cyclic sulphamide esters of Formula I

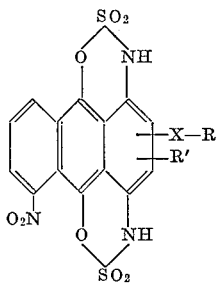

or cyclic sulphimide esters of Formua II

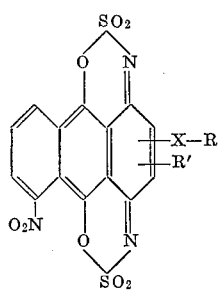

are reacted with sulphur in oleum. In Formulae I and II, X stands for an —O—, —S—, —SO— or —$SO_2$— group, R for an alkyl, aralkyl or aryl radical which may optionally bear further substituents, R' for hydrogen, halogen or —SR″—, —SOR″—, —$SO_2$R″— or OR″— groups and R″ for unsubstituted or substituted alkyl, aralkyl or aryl radicals.

The dyes obtained by the process according to the invention can be described by the following Formula III, wherein X, R and R' have the meaning stated above.

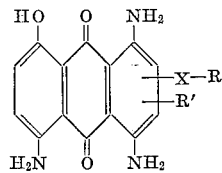

In the compounds used according to the invention, the aryl radicals, which are preferably phenyl radicals, may be substituted by one or several substituents of the most widely diverse nature. The following radicals are mentioned as examples: halogen atoms, such as chlorine, bromine, fluorine, alkyl groups with 1–12 carbon atoms, which may themselves be substituted by halogen, alkoxy (preferably low alkoxy), cyano or carboxyalkyl radicals, or optionally further substituted phenyl or phenoxy groups, (possibly esterified) carboxy groups, trifluoromethyl or acetyl groups, amino groups which may possibly be substituted by one or two (possibly substituted) alkyl (preferably low alkyl) or phenyl radicals.

If the radicals R and R″ are aralkyl radicals, preferably suitable are benzyl or naphthylmethyl radicals, which may be substituted by halogens or alkyl groups. If the radicals R and R″ in the above formulae stand for alkyl radicals, there are to be mentioned in particular those with 1–16 carbon atoms, it being possible that the alkyl radicals may be substituted, e.g. by halogen atoms, alkoxy, alkoxyalkyleneoxy, cyano or (possibly esterified) carboxy groups or by amine groups which may possibly be substituted by one or two alkyl, alkoxyalkyl, cyanoalkyl or phenyl radicals.

Examples of the anthraquinone sulphamide esters used as starting material are the following: adducts of cyclic 5-nitro-anthraquinone-1,4-disulphonimide with benzenesulphinic acid, 4-chloro-, 3-bromo- or 3-fluorobenzenesulphinic acid, 4-methyl-, 4-ethyl-, 4-isopropyl-, 4-butyl- or 4-amyl-benzenesulphinic acid, 3-trifluoromethyl-benzenesulphinic acid, 4-methoxy-, ethoxy- or butoxy-methylbenzenesulphinic acid, 4-methoxy- or 4-ethoxy-ethyl-benzenesulphinic acid, 4-β-chloro- or -cyanoethyl-benzenesulphinic acid, 3-carboethoxy-benzenesulphinic acid, 4 - ethoxycarbonylmethyl-benzenesulphinic acid, 4-phenyl- or 4-phenoxy-benzenesulphinic acid, 3-acetyl-benzenesulphinic acid, 4-amino- or 4-dimethylamino-benzenesulphinic acid, 4-phenylamino-benzenesulphinic acid, 2,5-dichlorobenzenesulphinic acid, 2,4-dimethyl-benzenesulphinic acid, α- and β-naphthalenesulphinic acid, benzylsulphinic acid, 4'-chlorobenzylsulphinic acid, α- and β-naphthylmethanesulphinic acid, methanesulphinic acid, chloro-, dichloro- or trichloromethane-sulphinic acid, ethane-, propane-, butane-, pentane-, hexane-, octane-, dodecane- or hexadecanesulphinic acid, 2-chloroethane- or 4-chloro-butane-sulphinic acid, 2-methoxy- or 2-ethoxyethane-sulphinic acid, 2-(ω-methoxy- or -ethoxyethyleneoxy)-ethanesulphinic acid, 2-cyanoethanesulphinic acid, ethoxycarbonylmethanesulphinic acid, methoxy - carbonylmethanesulphinic acid, 2-dimethyl- and 2-diethyl-aminoethanesulphinic acid, 2-bis-methoxyethyl- and 2-bis-cyanoethyl-ethanesulphinic acid, further the adducts of cyclic 5-nitro-2- and/or -3-bromo-anthraquinone-1,4-disulphonimide, of cyclic 5-nitro-2- and/or -3-chloro-anthraquinone-1,4-disulphonimide, of cyclic 5-nitro-2- and/or -3-methylthio-anthraquinone-1,4-disulphonimide, of cyclic 5-nitro-2- and/or -3-phenyl-thio-anthraquinone-1,4-disulphonimide, of cyclic 5-nitro-2- and/or -3-methylsulphoxido-anthraquinone-1,4-disulphonimide, of cyclic 5-nitro-2- and/or -3-phenylsulphoxido-anthraquinone-1,4-disulphonimide, of cyclic 5-nitro-2- and/or -3-methylsulphonyl-anthraquinone-1,4-disulphonimide, of cyclic 5-nitro-2- and/or -3-phenylsulphonyl-anthraquinone-1,4-disulphonimide, of cyclic 5-nitro-2- and/or - 3 - (4' - chloro) - phenylsulphonyl-anthraquinone-1,4-disulphonimide or of cyclic 5-nitro-2- and/or -3-(4' - methyl) - phenylsulphonyl-anthraquinone-1,4-disulphonimide with the above-mentioned sulphinic acids.

Sulphamide esters suitable for the process according to the invention are, furthermore, cyclic 5-nitro-2-methyl-thio-, benzylthio-, ethylthio- or -phenylthio-anthraquinone-1,4-disulphonamide, cyclic 5-nitro-2,3-bis-(methylthio- or -phenylthia)-anthraquinone-1,4-disulphonamide, cyclic 5-nitro-2-methylthio- or -phenylthio - 3 - bromo - anthraquinone-1,4-disulphonamide, cyclic 5-nitro-2-methylthio- or -phenylthio-3-chloro-anthraquinone-1,4 - disulphonamide, cyclic 5-nitro-2-methylsulphoxido- or -phenylsulphoxido-anthraquinone-1,4-disulphonamide, cyclic 5-nitro-2-merhylsulphoxido- or -phenylsulphoxido-3-bromo- or -chloro-anthraquinone-1,4-disulphonamide, cyclic 5-nitro-2,3-bis-methylsulphoxido- or -phenylsulphoxido-anthraquinone-1,4-disulphonamide.

Further suitable starting compounds for the process according to the invention are cyclic 5-nitro-2-methoxy-, -benzyloxy- or -phenoxy-anthraquinone-1,4-disulphonamide, cyclic 5-nitro-2,3-bis-(methoxy- or -phenoxy)-anthraquinone-1,4-disulphonamide, cyclic 5-nitro-2-methoxy- or -phenoxy-3-bromo-anthraquinone-1,4-disulphonamide, cyclic 5-nitro-2-methoxy- or -phenoxy-3-chloro-anthraquinone-1,4-disulphonamide, cyclic 5-nitro-2-methoxy- or -phenoxy-3-methylthio- or phenylthio-anthraquinone-1,4-disulphonamide, cyclic 5-nitro-2-methoxy- or -phenoxy-3-methylsulphinyl- or -phenylsulphinyl-anthraquinone-1,4-disulphonamide or cyclic 5-nitro-2-methoxy- or -phenoxy-3-methylsulphonyl- or phenylsulphonyl-anthraquinone-1,4-disulphonamide.

As already mentioned, instead of the cyclic sulphamide esters, cyclic sulphimide esters may be used for the process according to the invention, but it is more advantageous to use the cyclic sulphamide esters since the cyclic sulphimide esters have in most cases first to be prepared from the cyclic sulphamide esters by oxidation.

The process according to the invention may for example be carried out in such a manner that the cyclic sulphamide esters or the cyclic sulphimide esters are treated at 0–150° C., preferably 20–120° C., with a solution of sulphur in 5–65% oleum, excess sulphur then precipitated by cautious dilution with water and the reaction product isolated in known manner, e.g. by pasting of the solution on ice water. The sulphur is therefore used preferably in amounts of approximately 1 mole sulphur or more, e.g. 2 to 3 moles sulphur, per mole anthraquinone compound.

The dyes obtainable by the process according to the invention, or mixtures thereof, serve for the dyeing of natural fibers and synthetic materials, preferably polyamides, polyurethanes, polyacrylonitriles, polypropylene and polyesters, there being meant by polyesters linear aromatic polyesters in particular, such as polyethyleneterephthalate, or polyesters of terephthalic acid and 1,4-bis-hydroxymethyl-cyclohexane, as well as cellulose esters, such as cellulose triacetate or cellulose-2½-acetate. It is advantageous to bring the dyes into a finely divided state according to the customary methods, e.g. by reprecipitation, grinding or kneading in the presence of dispersing agents, and to use them according to known dyeing methods. While cellulose-2½-acetate is dyed for example at 60–80° C. in the presence of Marseilles soap, cellulose triacetate fibres and polyamide fibres, can be dyed for example at 100° C. In the dyeing of polyethyleneterephthalate fibres the usual dyeing accelerators may be added, or dyeing carried out at 120–145° C. under pressure. Moreover, the dyes are ideally suited for the dyeing and printing of polyester or polyamide fibres according to the thermosol process in which the padded or printed fibre materials, optionally after an intermediate drying, are heated for a short time to temperatures in the range around 180–220° C. The heating takes place generally for periods of 30 seconds to 2 minutes.

The dyeings and prints obtained with the dyes according to the invention are distinguished by clear shades and possess outstanding fastness to light, washing, thermofixation and sublimation, with high dye yield and very good build up.

In the following examples, parts are parts by weight unless otherwise stated.

EXAMPLE 1

(a) 11.1 parts flowers of sulphur are added at 15–20° C., to a mixture of 68 parts 65% oleum and 43 parts sulphuric acid monohydrate, the mixture stirred for 30 minutes at 15–20° C., and then diluted with 167 parts sulphuric acid monohydrate. 40 parts of a mixture of cyclic 5-nitro-2- and -3-(4'-chloro) - phenylsulphonyl-anthraquinone - 1.4 - disulphonamide are now introduced at 15–20° C., the mixture stirred for 2 hours at 25–28° C., warmed to 60° C., in 2 hours and heated to 90° C., in 1 hour. 67 parts 85% sulphuric acid are then added, the mixture heated to 115° C., and after 5 minutes at 115° C., allowed to cool. It is then diluted with 150 parts water, filtered off from the precipitated sulphur with suction, and the solution introduced into 1000 parts ice water. After filtration of the reddish blue amorphous product with suction, washing with water and drying, 28.2 parts of a dye mixture consisting of 1.4. 5 - triamino-8 - hydroxy - 2 - and -3 - (4' - chloro) - phenylsulphonyl-anthraquinone (=92% of the theory) are obtained.

When, instead of the mixture of cyclic 5-nitro-2- and -3-(4' - chloro) - phenyl - anthraquinone - 1.4 - disulphonamide, equivalent amounts of the corresponding 1.4-disulphonimide are used, the same end product is obtained Calculated for $C_{20}H_{14}ClN_3O_5S$ (443.8) (percent): Cl, 8.01; O, 18.05; S, 7.22. Found (percent): Cl, 7.89; O, 18.33; S, 7.64.

The mixture of cyclic 5-nitro-2- and -3-(4'-chloro)-phenylsulphonyl - anthraquinone - 1.4 - sulphonamide used as starting material can be prepared for example as follows: 19.2 parts 80.4% sodium p-chlorobenzene-sulphinate are added, in 1–2 hours at 20–25° C., to 240 parts cyclic 5 - nitro- anthraquinone - 1.4 - disulphonimide in a mixture of 1500 parts methanol and 44 parts 98% sulphuric acid. Stirring is continued for about 2 hours, the product which has crystallised in beautiful yellow needles is filtered off with suction, washed with water and, after drying, 310 parts of a mixture of cyclic 5-nitro - 2 - and -3-(4'-chloro)-phenylsulphonyl-anthraquinone-1,4 - disulphonamide (=90% of the theory) are obtained. Instead of in methanol, the reaction may also be carried out in other solvents such as water or glacial acetic acid, optionally with heating.

(b) A fabric consisting of polyethyleneterephthalate fibres is impregnated on a padding mangle with a liquor which contains, per litre, 20 g. of a mixture of 1.4.5-triamino - 8 - hydroxy - 2 - and -3-(4' - chloro) - phenyl-sulphonyl - anthraquinone and 10 g. of a thermosol auxiliary, in particular a polyether such as is described for example in Belgian patent specification No. 615,102. The fabric is then squeezed until there is a weight increase of 70% and dried in a suspension jet drier or drying cabinet at 80–120° C. The fabric is then treated with hot air for about 45 seconds at 190–210° C., in a stenter or jet hot flue after which it is rinsed, possibly subjected to a reductive after-treatment, washed, rinsed and dried. The reductive after-treatment for the purpose of removing the portion of dye adhering superficially to the fibres may occur in such a manner that the fabric is entered at 25° C., into a liquor containing 3–5 ccm./l. solution of caustic soda at 38° Bé. and 1–2 g./l. concentrated hydrosulphite, heated to 70° C., within about 15 minutes and left at 70° C., for a further 10 minutes. It is then rinsed hot, acidified at 50° C., with 2–3 ccm./l. 85% formic acid, rinsed and dried. A clear, blue dyeing is obtained which is distinguished by its high dye yield and very good build as well as by outstanding fastness to light, thermofixation, washing, rubbing and sublimation. In similar manner a clear, blue dyeing is obtained when, instead of polyethyleneterephthalate fibres, polyester fibres from 1.4-bis-hydroxymethylcyclohexane and terephthalic acid, or cellulose triacetate fibres or polyamide fibres, are used.

(c) A pre-cleaned and thermofixed fabric consisting of polyethyleneterephthalate fibres is printed with a printing paste which consists of the following components: 40 g. of a mixture of 1.4.5-triamino-8-hydroxy-2- and -3-(4'-chloro)-phenylsulphonyl-anthraquinone, 475 g. water, 465 g. crystal gum 1:2 and 20 g. sulphonated castor oil. Instead of crystal gum an alginate thickener may be used. In order to fix the dye, the printed and dried goods are taken, at 190–210° C., over a high-performance stenter or through a condensation machine. The duration of treatment is 30–60 seconds. The fixed print obtained is then rinsed cold, soaped at 70–80° C., for about 10 minutes with 1–2 g./l. anion-active washing agent, first hot-rinsed and then cold-rinsed, and dried. A print analogous to the dyeing of Example 1(b) is obtained which is distinguished by the same outstanding fastnesses. In similar manner a clear, blue print is obtained when, instead of polyethyleneterephthalate fibres, polyester fibres from 1.4-bis-hydroxymethylcyclohexane and terephthalate acid, or cellulose triacetate fibres or polyamide fibres, are used.

(d) 10 parts by weight polyethyleneterephthalate fibres are dyed at 125–130° C., for 2 hours in a liquor adjusted to pH 4.5 and consisting of 400 parts by weight water and 0.1 part by weight of the finely dispersed dye mentioned in Example 1(a), then rinsed and dried. A clear, blue dyeing distinguished by high fastnesses is obtained.

(e) 10 parts by weight polyethyleneterephthalate fibres are dyed at 100° C., for 1.5 hours in a liquor adjusted to pH 4.5 and consisting of 400 parts water, 0.1 part by weight of the finely dispersed dye mentioned in Example 1(a) and 1.5 parts by weight cresotic acid methyl ester. A clear, blue dyeing characterised by very good fastnesses is obtained.

The dyes which are obtained from mixtures of cyclic 5-nitro-2- and -3-arylsulphonyl-anthraquinone-1.4-disulphonamides or -1.4-disulphonimides according to Example 1(a), and their shades on polyethyleneterephthalate fibres, are given in the following table:

| Example | Dye mixture consisting of— | Shade |
|---|---|---|
| 2 | 1.4.5-triamino-8-hydroxy-2- and -3-phenylsulphonyl-anthraquinone. | Blue. |
| 3 | 1.4.5-triamino-8-hydroxy-2- and -3-(2'-chloro)-phenylsulphonyl-anthraquinone. | Do. |
| 4 | 1.4.5-triamino-8-hydroxy-2- and -3-(3'-bromo)-phenylsulphonyl-anthraquinone. | Do. |
| 5 | 1.4.5-triamino-8-hydroxy-2- and -3-(3'-fluoro)-phenylsulphonyl-anthraquinone. | Do. |
| 6 | 1.4.5-triamino-8-hydroxy-2- and -3-(4'-methyl)-phenylsulphonyl-anthraquinone. | Do. |
| 7 | 1.4.5-triamino-8-hydroxy-2- and -3-(4'-ethyl)-phenylsulphonyl-anthraquinone. | Do. |
| 8 | 1.4.5-triamino-8-hydroxy-2- and -3-(4'-isobutyl)-phenylsulphonyl-anthraquinone. | Do. |
| 9 | 1.4.5-triamino-8-hydroxy-2- and -3-(3'-trifluoromethyl)-phenylsulphonyl-anthraquinone. | Do. |
| 10 | 1.4.5-triamino-8-hydroxy-2- and -3-(4'-methoxymethyl)-phenylsulphonyl-anthraquinone. | Do. |
| 11 | 1.4.5-triamino-8-hydroxy-2- and -3-(4'-ethoxymethyl)-phenylsulphonyl-anthraquinone. | Do. |
| 12 | 1.4.5-triamino-8-hydroxy-2- and -3-(4'-β-methoxyethyl)-phenylsulphonyl-anthraquinone. | Do. |
| 13 | 1.4.5-triamino-8-hydroxy-2- and -3- (4'-cyanomethyl)-phenylsulphonyl-anthraquinone. | Do. |
| 14 | 1.4.5-triamino-8-hydroxy-2- and -3-(4'-ethoxycarbonylmethyl)-phenylsulphonyl-anthraquinone. | Do. |
| 15 | 1.4.5-triamino-8-hydroxy-2- and -3-(4'-phenoxy)-phenylsulphonyl-anthraquinone. | Do. |
| 16 | 1.4.5-triamino-8-hydroxy-2- and -3-(3'-ethoxycarbonyl)-phenylsulphonyl-anthraquinone. | Do. |
| 17 | 1.4.5-triamino-8-hydroxy-2- and -3- (4'-methoxycarbonyl)-phenylsulphonyl-anthraquinone. | Do. |
| 18 | 1.4.5-triamino-8-hydroxy-2- and -3-(4'-amino)-phenylsulphonyl-anthraquinone. | Do. |
| 19 | 1.4.5-triamino-8-hydroxy-2- and -3-(4'-dimethylamino)-phenylsulphonyl-anthraquinone. | Do. |
| 20 | 1.4.5-triamino-8-hydroxy-2- and -3-(4'-diethylamino)-phenylsulphonyl-anthraquinone. | Do. |
| 21 | 1.4.5-triamino-8-hydroxy-2- and -3- (4'-N-β-bismethoxyethylamino)-phenylsulphonyl-anthraquinone. | Do. |
| 22 | 1.4.5-triamino-8-hydroxy-2- and -3- (4'-N-β-biscyanoethylamino)-phenylsulphonyl. | Do. |
| 23 | 1.4.5-triamino-8-hydroxy-2- and -3- (4'-phenylamino)-phenylsulphonyl-anthraquinone. | Blue. |
| 24 | 1.4.5-triamino-8-hydroxy-2- and -3- (2'.5'-dichloro)-phenylsulphonyl-anthraquinone. | Do. |
| 25 | 1.4.5-triamino-8-hydroxy-2- and -3- (2'.4'-dimethyl)-phenylsulphonyl-anthraquinone. | Do. |
| 26 | 1.4.5-triamino-8-hydroxy-2- and -3- (2'.4'.6'-trimethyl)-phenylsulphonyl-antraquinone. | Do. |
| 27 | 1.4.5-triamino-8-hydroxy-2- and -3- β-naphthyl-sulphonyl-anthraquinone. | Do. |
| 28 | 1.4.5-triamino-8-hydroxy-2- and -3- α-naphthyl-sulphonyl-anthraquinone. | Do. |
| 29 | 1.4.5-triamino-8-hydroxy-2- and -3- (4'-methylthio)-phenyl-anthraquinone. | Do. |

EXAMPLE 30

11.1 parts flowers of sulphur are added at 15–20° C., to a mixture of 68 parts 65% oleum and 43 parts sulphuric acid monohydrate, the mixture stirred for 30 minutes at 15–20° C., and then diluted with 167 parts sulphuric acid monohydrate. 37.6 parts cyclic 5-nitro-2-phenylsulphonyl - anthraquinone - 1.4 - disulphonimide are now introduced at 15–20° C., the mixture stirred for 2 hours at 25–28° C., warmed to 60° C., in 2 hours and heated to 90° C., in 1 hour. 67 parts 85% sulphuric acid are then added, the mixture heated to 115° C., and after 5 minutes at 115° C., allowed to cool. It is then diluted with 120 parts water, filtered off from precipitated sulphur with suction and then water is added slowly until the reaction product has crystallised out in small orange-red needles. It is filtered off with suction and after washing with water and drying, 25.4 parts 1.4.5-triamino - 8 - hydroxy - 2 - phenylsulphonyl - anthraquinone (=90.5% of the theory) are obtained in small blue needles.

Calculated for $C_{20}H_{15}N_3O_5S$ (409.3) (percent): N, 10.27; O, 19.55; S, 7.82. Found (percent): N, 10.02; O, 19.87; S, 8.12.

Dyed or printed according to the processes of Example 1(b) or 1(c), on polyethyleneterephthalate fibres clear blue needles are obtained which are distinguished by outstanding fastness to light, thermofixation, sublimation, rubbing, and washing, with high dye yield and very good build. The cyclic 5-nitro-2-phenylsulphonyl-anthraquinone-1.4-disulphonimide used as starting material can be prepared for example by reaction of 1.4-diamino-2-phenylsulphonyl-5-nitro-anthraquinone with oleum at 15–25° C. Instead of the cyclic disulphonimide, in the above example an equivalent amount of 1.4-diamino-2-phenylsulphonyl-5-nitro-anthraquinone may be used, the cyclic disulphonimide then being formed in situ in the reaction with sulphur in oleum.

The dyes which are obtained from cyclic 5-nitro-2-arylsulphonyl-anthraquinone-1.4-disulphonimide according to Example 30, and their shades on polyethyleneterephthalate fibres, are given in the following table:

| Example | Dye mixture consisting of— | Shade |
|---|---|---|
| 31 | 1.4.5-triamino-8-hydroxy-2-(4'-chloro)-phenylsulphonyl-anthraquinone. | Blue. |
| 32 | 1.4.5-triamino-8-hydroxy-2-(3'-bromo)-phenylsulphonyl-anthraquinone. | Do. |
| 33 | 1.4.5-triamino-8-hydroxy-2-(3'-fluoro)-phenylsulphonyl-anthraquinone. | Do. |
| 34 | 1.4.5-triamino-8-hydroxy-2-(4'-methyl)-phenylsulphonyl-anthraquinone. | Do. |
| 35 | 1.4.5-triamino-8-hydroxy-2-(3'-trifluoromethyl)-phenylsulphonyl-anthraquinone. | Do. |
| 36 | 1.4.5-triamino-8-hydroxy-2-(4'-methoxymethyl)-phenylsulphonyl-anthraquinone. | Do. |
| 37 | 1.4.5-triamino-8-hydroxy-2-(4'-β-methoxyethyl)-phenylsulphonyl-anthraquinone. | Do. |

| Example | Dye mixture consisting of— | Shade |
|---|---|---|
| 38 | 1.4.5-triamino-8-hydroxy-2-(4'-ethoxycarbonyl-methyl)-phenylsulphonyl-anthraquinone. | Blue. |
| 39 | 1.4.5-triamino-8-hydroxy-2-(3'-ethoxycarbonyl)-phenylsulphonyl-anthraquinone. | Do. |
| 40 | 1.4.5-triamino-8-hydroxy-2-(4'-methoxycarbonyl)-phenylsulphonyl-anthraquinone. | Do. |
| 41 | 1.4.5-triamino-8-hydroxy-2-(4'-dimethylamino)-phenylsulphonyl-anthraquinone. | Do. |
| 42 | 1.4.5-triamino-8-hydroxy-2-(4'-phenylamino)-phenylsulphonyl-anthraquinone. | Do. |
| 43 | 1.4.5-triamino-8-hydroxy-2-(2'5'-dichloro)-phenylsulphonyl-anthraquinone. | Do. |
| 44 | 1.4.5-triamino-8-hydroxy-2-(4'-methylthio)-phenylsulphonyl-anthraquinone. | Do. |
| 45 | 1.4.5-triamino-8-hydroxy-2-(2'4'-dimethyl)-phenylsulphonyl-anthraquinone. | Do. |
| 46 | 1.4.5-triamino-8-hydroxy-2-β-naphthylsulphonyl-anthraquinone. | Do. |
| 47 | 1.4.5-triamino-8-hydroxy-2-α-naphthylsulphonyl-anthraquinone. | Do. |

EXAMPLE 48

11.1 parts flowers of sulphur are added at 15–20° C. to a mixture of 68 parts 65% oleum and 43 parts sulphuric acid monohydrate, the mixture stirred for 30 minutes at 15–20° C. and then diluted with 167 parts sulphuric acid monohydrate. 32.5 parts of a mixture of cyclic 5-nitro-2-and -3-methylsulphonyl-anthraquinone-1.4-disulphonamide are introduced at 15–20° C. and the mixture is stirred for 2 hours at 15–28° C., warmed to 60° C. in 2 hours and heated to 90° C. in 1 hour. 67 parts 85% sulphuric acid are then added and the mixture is heated to 115° C. and after 5 minutes at 115° C. allowed to cool. It is then diluted at 15–25° C. with 150 parts water, filtered off from excess sulphur with suction and the solution introduced into 1000 parts ice water. After the reddish blue amorphous product has been filtered off with suction, washed with water and dried, 20.6 parts of a dye mixture consisting of 1.4.5-triamino-8-hydroxy-2- and 3-methylsulphonyl-anthraquinone (=89% of the theory) are obtained.

*Analysis.*—Calculated for $C_{15}H_{13}N_3O_5S$ (347.3) (percent): N, 12.1; O, 23.05; S, 9.23. Found (percent): N, 11.91; O, 23.28; S, 9.41.

Dyed or printed according to the process of Example 1(b) or 1(c), the dye yields on polyethyleneterephthalate fibres clear blue shades which are distinguished by very good fastness to light, thermofixation, sublimation, rubbing and washing, with high dye yield and very good build.

The mixture of cyclic 5-nitro-2- and -3-methylsulphonyl-anthraquinone-1.4-disulphonamide which is used as starting mixture can be prepared for example as follows: 80 parts 32% sodium methanesulphinate are added at 20° C. to 60 parts cyclic 5-nitro-anthraquinone-1.4-disulphonimide in 300 parts water and 11 parts 98% sulphuric acid, the mixture heated to 65–70° C. in about 1 hour and stirred at 65–70° C. until the reaction is ended. After the mixture has cooled, the product which has precipitated in yellow crystals is filtered off with suction, washed with water and, after drying, 70 parts of a mixture of cyclic 5-nitro-2- and -3-methylsulphonyl-anthraquinone-1,4-disulphonamide (=97.5% of the theory) are obtained.

When, as starting material for the reaction with sulphur, in oleum, there are used instead of a mixture of cyclic 5-nitro-2- and -3-methylsulphonyl-anthraquinone - 1.4- disulphonamide equivalent amounts of the corresponding 1.4-disulphonimide, the same end product is obtained.

The dyes which are obtained from mixtures of cyclic 5-nitro-2- and -3-alkyl- or aralkyl-sulphonyl-anthraquinone-1.4-disulphonamides or -1.4-disulphonimides according to Example 48, and their shades on polyethylene terephthalate fibres, are given in the following table:

| Example | Dye mixture consisting of— | Shade |
|---|---|---|
| 49 | 1.4.5-triamino-8-hydroxy-2- and -3-ethylsulphonyl-anthraquinone. | Blue. |
| 50 | 1.4.5-triamino-8-hydroxy-2- and -3-propylsulphonyl-anthraquinone. | Do. |
| 51 | 1.4.5-triamino-8-hydroxy-2- and -3-isobutylsulphonyl-anthraquinone. | Do. |
| 52 | 1.4.5-triamino-8-hydroxy-2- and -3-hexylsulphonyl-anthraquinone. | Do. |
| 53 | 1.4.5-triamino-8-hydroxy-2- and -3-(3-methyl)-cyclohexylsulphonyl-anthraquinone. | Do. |
| 54 | 1.4.5-triamino-8-hydroxy-2- and -3-δ-chlorobutyl-sulphonyl-anthraquinone. | Do. |
| 55 | 1.4.5-triamino-8-hydroxy-2- and -3-chloromethyl-sulphonyl-anthraquinone. | Do. |
| 56 | 1.4.5-triamino-8-hydroxy-2- and -3-β-bromethyl-sulphonyl-anthraquinone. | Do. |
| 57 | 1.4.5-triamino-8-hydroxy-2- and -3-β-methoxyethyl-sulphonyl-anthraquinone. | Do. |
| 58 | 1.4.5-triamino-8-hydroxy-2- and -3-β-(ω-methoxy-ethyleneoxyethylsulphonyl)-anthraquinone. | Do. |
| 59 | 1.4.5-triamino-8-hydroxy-2- and -3-β-ethoxyethyl-sulphonyl-anthraquinone. | Do. |
| 60 | 1.4.5-triamino-8-hydroxy-2- and -3-β- cyanoethyl-sulphonyl-anthraquinone. | Do. |
| 61 | 1.4.5-triamino-8-hydroxy-2- and -3-ethoxycarbonyl-methylsulphonyl-anthraquinone. | Do. |
| 62 | 1.4.5-triamino-8-hydroxy-2- and -3-β-methoxy-carbonylethylsulphonyl-anthraquinone. | Do. |
| 63 | 1.4.5-triamino-8-hydroxy-2- and -3-β-dimethylamino-ethylsulphonyl-anthraquinone. | Do. |
| 64 | 1.4.5-triamino-8-hydroxy-2- and -3-β-diethylamino-ethylsulphonyl-anthraquinone. | Do. |
| 65 | 1.4.5-triamino-8-hydroxy-2- and -3-N-β-bis-methoxy-ethylaminoethylsulphonyl-anthraquinone. | Do. |
| 66 | 1.4.5-triamino-8-hydroxy-2- and -3-N-β-biscyano-ethylaminoethylsulphonyl-anthraquinone. | Do. |
| 67 | 1.4.5-triamino-8-hydroxy-2- and -3-benzylsulphonyl-anthraquinone. | Do. |
| 68 | 1.4.5-triamino-8-hydroxy-2-and -3-(4'-chloro)-benzyl-sulphonyl-anthraquinone. | Do. |
| 69 | 1.4.5-triamino-8-hydroxy-2- and -3-β-naphthyl-methylsulphonyl-anthraquinone. | Do. |

EXAMPLE 70

11.1 parts flowers of sulphur are added at 15–20° C. to a mixture of 68 parts 65% oleum and 43 parts sulphuric acid monohydrate, the mixture stirred for 30 minutes at 15–20° C. and then diluted with 167 parts sulphuric acid monohydrate. 32.5 parts cyclic 5-nitro-2-methylsulphonyl-anthraquinone-1.4-disulphonimide are now introduced at 15–20° C., the mixture stirred at 25–28° C. for 2 hours, warmed to 60° C. in 2 hours and heated to 90° C. in 1 hour. 67 parts 85% sulphuric acid are then added, the mixture heated to 115° C. and then diluted at 15–20° C. with 150 parts water. After being filtered off from excess sulphur with suction, the solution is slowly diluted at 15–25° C. with water until the reaction product has precipitated in small orange-red crystals. By filtering off with suction, washing with water and drying, 19.2 parts 1.4.5-triamino-8-hydroxy-2-methyl-sulphonyl-anthraquinone (=83% of the theory) are obtained in the form of small blue crystals.

*Analysis.*—Calculated for $C_{15}H_{13}N_3O_5S$ (347.3) (percent): N, 12.1; O, 23.05; S, 9.23. Found (percent): N, 11.95; O, 23.21; S, 9.48.

Dyed or printed according to the process of Example 1(b) or 1(c), the dye yields on polyethyleneterephthalate fibres clear blue shades which are distinguished by very good fastness to light, thermofixation, sublimation, rubbing and washing, with high dye yield and very good build.

The cyclic 5-nitro-2-methylsulphonyl-anthraquinone-1.4-disulphonimide used as starting material can be prepared for example by reaction of 1.4-diamino-2-methyl-sulphonyl-5-nitro-anthraquinone with oleum at 15–20° C. Instead of the cyclic disulphonimide, in the above example an equivalent amount of 1.4-diamino-2-methyl-sulphonyl-5-nitro-anthraquinone may be used, the cyclic disulphonimide then being formed in situ in the reaction with sulphur in oleum.

The dyes which are obtained from cyclic 5-nitro-2-alkyl- or -aralkylsulphonyl-anthraquinone-1,4-disulphonimides according to Example 70, and their shades on polyethyleneterephthalate fibres, are given in the following table:

| Example | Dye mixture consisting of— | Shade |
|---|---|---|
| 71 | 1.4.5-triamino-8-hydroxy-2-ethylsulphonyl-anthraquinone. | Blue. |
| 72 | 1.4.5-triamino-8-hydroxy-2-propylsulphonyl-anthraquinone. | Do. |
| 73 | 1.4.5-triamino-8-hydroxy-2-(4'-methyl)-cyclohexyl-sulphonyl-anthraquinone. | Do. |
| 74 | 1.4.5-triamino-8-hydroxy-2-Δ-chlorobutylsulphonyl-anthraquinone. | Do. |
| 75 | 1.4.5-triamino-8-hydroxy-2-chloromethylsuphonyl-anthraquinone. | Do. |
| 76 | 1.4.5-triamino-8-hydroxy-2-β-bromoethylsulphonyl-anthraquinone. | Do. |
| 77 | 1.4.5-triamino-8-hydroxy-2-β-cyanoethylsulphonyl-anthraquinone. | Do. |
| 78 | 1.4.5-triamino-8-hydroxy-2-ethoxycarbonylmethyl-sulphonyl-anthraquinone. | Do. |
| 79 | 1.4.5-triamino-8-hydroxy-2-β-methoxycarbonylethyl-sulphonyl-anthraquinone. | Do. |
| 80 | 1.4.5-triamino-8-hydroxy-2-β-methoxyethylsul-phonyl-anthraquinone. | Do. |
| 81 | 1.4.5-triamino-8-hydroxy-2-β-dimethylaminoethyl-sulphonyl-anthraquinone. | Do. |
| 82 | 1.4.5-triamino-8-hydroxy-2-benzylsulphonyl-anthraquinone. | Do. |
| 83 | 1.4.5-triamino-8-hydroxy-2-(4'-chloro)-benzylsul-phonyl-anthraquinone. | Do. |
| 84 | 1.4.5-triamino-8-hydroxy-2-β-naphthylmethylsul-phonyl-anthraquinone. | Do. |

EXAMPLE 85

37.7 parts cyclic 5-nitro-2.3-bis-methylsulphonyl-anthraquinone-1.4-disulphonamide are reacted with sulphur in oleum according to Example 1(a) and after working up as described therein 1.4.5-triamino-8-hydroxy-2.3-bis-methylsulphonyl-anthraquinone is obtained as blue powder.

Dyed or printed according to the process of Example 1(b) or 1(c), the dye yields on polyethyleneterephthalate fibres reddish blue shades which exhibit very good fastness to light, thermofixation, sublimation, rubbing and washing.

The dyes which are obtained from appropriate 2.3-disubstituted cyclic 5-nitro-anthraquinone-1.4-disulphon-amides or -1,4-disulphonimides according to Example 1(a), and their shades on polyethyleneterephthalate fibres, are given in the following table:

| Example | Dye mixture consisting of— | Shade |
|---|---|---|
| 86 | 1.4.5-triamino-8-hydroxy-2.3-bis(phenylsul-phonyl)-anthraquinone. | Reddish blue. |
| 87 | 1.4.5-triamino-8-hydroxy-2-phenyl-sulphonyl 3-methylsulphonyl-anthraquinone. | Do. |
| 88 | 1.4.5-triamino-8-hydroxy-2-benzyl-sulphonyl 3-methylsulphonyl-anthraquinone. | Do. |
| 89 | 1.4.5-triamino-8-hydroxy-2-phenyl-sulphonyl 3-bromo-anthraquinon. | Do. |
| 90 | 1.4.5-triamino-8-hydroxy-2-methyl-sulphonyl-3-bromo-anthraquinone. | Do. |
| 91 | 1.4.5-triamino-8-hydroxy-2-phenyl-sulphonyl-3-chloro-anthraquinone. | Do. |
| 92 | 1.4.5-triamino-8-hydroxy-2-methyl sulphonyl-3-chloro-anthraquinone. | Do. |
| 93 | 1.4.5-triamino-8-hydroxy-2-phenyl-sulphonyl-3-phenylthio-anthraquinone. | Do. |
| 94 | 1.4.5-triamino-8-hydroxy-2-phenyl-sulphonyl-3-ethylthio-anthraquinone. | Do. |
| 95 | 1.4.5-triamino-8-hydroxy-2-methyl-sulphonyl-3-phenylthio-anthraquinone. | Do. |
| 96 | 1.4.5-triamino-8-hydroxy-2-methyl-sulphonyl-3-ethylthio-anthraquinone. | Do. |
| 97 | 1.4.5-triamino-8-hydroxy-2-methyl-sulphonyl-3-phenylsulphonyl-anthraquinone. | Do. |
| 98 | 1.4.5-triamino-8-hydroxy-2-methyl-sulphonyl-3-ethylsulphinyl-anthraquinone. | Do. |
| 99 | 1.4.5-triamino-8-hydroxy-2-phenyl-sulphonyl-3-ethylsulphinyl-anthraquinone. | Do. |

EXAMPLE 100

35.6 parts cyclic 5-nitro-2-phenylthio-anthraquinone-1.4-disulphonimide are reacted with sulphur in oleum according to Example 1(a) and after working up as described therein 1.4.5-triamino-8-hydroxy-2-phenylthio-anthraquinone is obtained as blue powder. Dyed or printed according to the process of Example 1(b) or 1(c), the dye yields on polyethyleneterephthalate fibres clear, blue shades which exhibit excellent fastness to light, thermofixation, sublimation, rubbing and washing, with high dye yield and very good build.

The dyes which are obtained from cyclic 5-nitro-2-aryl-, alkyl- or aralkylthio-anthraquinone-1.4-disulphonimides or -1,4-desulphonamides according to Example 1(a), and their shades on polyethyleneterephthalate fibres, are given in the following table:

| Example | Dye mixture consisting of— | Shade |
|---|---|---|
| 101 | 1.4.5-triamino-8-hydroxy-2-(4'-chloro)-phenylthio-anthraquinone. | Blue. |
| 102 | 1.4.5-triamino-8-hydroxy-2-(4'-bromo)-phenylthio-anthraquinone. | Do. |
| 103 | 1.4.5-triamino-8-hydroxy-2-(4'-methyl)-phenylthio-anthraquinone. | Do. |
| 104 | 1.4.5-triamino-8-hydroxy-2-(3'-methyl)-phenylthio-anthraquinone. | Do. |
| 105 | 1.4.5-triamino-8-hydroxy-2-(4'-t-butyl)-phenylthio-anthraquinone. | Do. |
| 106 | 1.4.5-triamino-8-hydroxy-2-(4'-methoxy-methyl)-phenylthio-anthraquinone. | Do. |
| 107 | 1.4.5-triamino-8-hydroxy-2-(4'-chloromethyl)-phenylthio-anthraquinone. | Do. |
| 108 | 1.4.5-triamino-8-hydroxy-2-(4'-ethoxy-carbonyl-methyl)-phenylthio-anthraquinone. | Do. |
| 109 | 1.4.5-triamino-8-hydroxy-2-(4'-methoxy-carbonyl)-phenylthio-anthraquinone. | Do. |
| 110 | 1.4.5-triamino-8-hydroxy-2-(3'-ethoxy-carbonyl)-phenylthio-anthraquinone. | Do. |
| 111 | 1.4.5-triamino-8-hydroxy-2-(4'-dimethyl-amino-phenylthio-anthraquinone. | Do. |
| 112 | 1.4.5-triamino-8-hydroxy-2-methylthio-anthraquinone. | Do. |
| 113 | 1.4.5-triamino-8-hydroxy-2-ethylthio-anthraquinone. | Do. |
| 114 | 1.4.5-triamino-8-hydroxy-2-propylthio-anthraquinone. | Do. |
| 115 | 1.4.5-triamino-8-hydroxy-2-(3'-methyl)-cyclohexylthio-anthraquinone. | Do. |
| 116 | 1.4.5-triamino-8-hydroxy-2-β-methoxyethylthio-anthraquinone. | Do. |
| 117 | 1.4.5-triamino-8-hydroxy-2-β-ethoxyethylthio-anthraquinone. | Do. |
| 118 | 1.4.5-triamino-8-hydroxy-2-ω-methoxy-β-ethyleneoxyethylthio-anthraquinone. | Do. |
| 119 | 1.4.5-triamino-8-hydroxy-2-β-cyanoethylthio-anthraquinone. | Do. |
| 120 | 1.4.5-triamino-8-hydroxy-2-β-methoxy-carbonyl-ethylthio-anthraquinone. | Do. |
| 121 | 1.4.5-triamino-8-hydroxy-2-ethoxy-carbonyl-methylthio-anthraquinone. | Do. |
| 122 | 1.4.5-triamino-8-hydroxy-2-β-dimethylamino-ethylthio-anthraquinone. | Do. |
| 123 | 1.4.5-triamino-8-hydroxy-2-benzylthio-anthraquinone. | Do. |
| 124 | 1.4.5-triamino-8-hydroxy-2-(4'-chloro)-benzylthio-anthraquinone. | Do. |
| 125 | 1.4.5-triamino-8-hydroxy-2-(3'-bromo)-phenylthio-anthraquinone. | Do. |

EXAMPLE 126

45.2 parts cyclic 5-nitro-2,3-bis-(4'-methylphenylthio)-anthraquinone-1.4-disulphonamide are reacted with sulphur in oleum according to Example 1(a) and after working up as described therein 1.4.5-triamino-8-hydroxy-2,3-bis-(4'-methylphenylthio)-anthraquinone is obtained as reddish blue powder. Dyed or printed according to the process of Examples 1(b) or 1(c), the dye yields, on polyethyleneterephthalate fibres, reddish blue shades which exhibit very good fastness to light, thermofixation, sublimation, rubbing and washing.

The dyes which are obtained from appropriate 2.3-disubstituted cyclic 5-nitro-anthraquinone-1.4-disulphon-amides or -1.4-disulphonimides according to Example 1(a), and their shades on polyethyleneterephthalate fibres, are given in the following table:

| Example | Dye mixture consisting of— | Shade |
|---|---|---|
| 127 | 1.4.5-triamino-8-hydroxy-2.3-bis-(phenylthio)-anthraquinone. | Reddish blue. |
| 128 | 1.4.5-triamino-8-hydroxy-2-phenylthio-3-methylthio-anthraquinone. | Do. |
| 129 | 1.4.5-triamino-8-hydroxy-2-methylthio-3-phenylthio-anthraquinone. | Do. |
| 130 | 1.4.5-triamino-8-hydroxy-2.3-bis-ethylthio-anthraquinone. | Do. |
| 131 | 1.4.5-triamino-8-hydroxy-2.3-bis-(methoxy-carbonylmethylthio)-anthraquinone. | Do. |
| 132 | 1.4.5-triamino-8-hydroxy-2-ethylthio-3-methoxycarboxylmethylthio-anthraquinone. | Do. |
| 133 | 1.4.5-triamino-8-hydroxy-2-phenylthio-3-bromo-anthraquinone. | Do. |
| 134 | 1.4.5-triamino-8-hydroxy-2-phenylthio-3-chloro-anthraquinone. | Do. |
| 135 | 1.4.5-triamino-8-hydroxy-2-methylsulphonyl-3-phenylthio-anthraquinone. | Do. |
| 136 | 1.4.5-triamino-8-hydroxy-2-ethylthio-3-bromo-anthraquinone. | Do. |
| 137 | 1.4.5-triamino-8-hydroxy-2-ethylthio-3-chloro-anthraquinone. | Do. |

EXAMPLE 138

36.8 parts cyclic 5-nitro-2-phenylsulphinyl-anthraquinone-1.4-disulphonimide are reacted with sulphur in oleum acording to Example 1(a) after working up as described therein 1.4.5-triamino-8-hydroxy - 2 - phenylsulphinyl-anthraquinone is obtained as blue powder. Dyed or printed according to the process of Example 1(b) or 1(c), the dye yields on polyethyleneterephthalate fibres clear blue shades which are distinguished by very good fastness to light, sublimation, thermofixation, rubbing and washing.

The dyes which are obtained from appropriately 2-substituted or 2.3-disubstituted 5-nitro-anthroquinone-1.4-disulphonamides or -1.4 disulphonimides according to Example 1(a), and their shades on polyethyleneterephthalate fibres, are given in the following table:

| Example | Dye mixture consisting of— | Shade |
|---|---|---|
| 139 | 1.4.5-triamino-8-hydroxy-2-(4'-chloro)-phenylsulphinyl-anthraquinone. | Blue. |
| 140 | 1.4.5-triamino-8-hydroxy-2-(4'-methyl)-phenylsulphinyl-anthraquinone. | Do. |
| 141 | 1.4.5-triamino-8-hydroxy-2-(4'-methoxy-carbonyl)-phenylsulphinyl-anthraquinone. | Do. |
| 142 | 1.4.5-triamino-8-hydroxy-2-(4'-methoxy-methyl)-phenylsulphinyl-anthraquinone. | Do. |
| 143 | 1.4.5-triamino-8-hydroxy-2-methylsulphinyl-anthraquinone. | Do. |
| 144 | 1.4.5-triamino-8-hydroxy-2-ethylsulphinyl-anthraquinone. | Do. |
| 145 | 1.4.5-triamino-8-hydroxy-2-β-methoxy-ethylsulphinyl-anthraquinone. | Do. |
| 146 | 1.4.5-triamino-8-hydroxy-2-ω-methoxy-β-ethyleneoxyethylsulphinyl-anthraquinone. | Do. |
| 147 | 1.4.5-triamino-8-hydroxy-2-β-cyanoethyl-sulphinyl-anthraquinone. | Do. |
| 148 | 1.4.5-triamino-8-hydroxy-2-ethoxy-carbonyl-methylsulphinyl-anthraquinone. | Do. |
| 149 | 1.4.5-triamino-8-hydroxy-2-methoxy-carbonylethylsulphinyl-anthraquinone. | Do. |
| 150 | 1.4.5-triamino-8-hydroxy-2-β-dimethyl-ethylaminoethylsuophinyl-anthraquinone. | Do. |
| 151 | 1.4.5-triamino-8-hydroxy-2-benzylsulphinyl-anthraquinone. | Do. |
| 152 | 1.4.5-triamino-8-hydroxy-2.3-bis-(phenyl-sulphinyl)-anthraquinone. | Reddish blue. |
| 153 | 1.4.5-triamino-8-hydroxy-2-phenylsulphinyl-3-methylsulphinyl-anthraquinone. | Do. |
| 154 | 1.4.5-triamino-8-hydroxy-2.3-bis-methyl-sulphinyl-anthraquinone. | Do. |
| 155 | 1.4.5-triamino-8-hydroxy-2-phenylsulphinyl-3-bromo-anthraquinone. | Do. |
| 156 | 1.4.5-triamino-8-hydroxy-2-phenylsulphinyl-3-chloro-anthraquinone. | Do. |
| 157 | 1.4.5-triamino-8-hydroxy-2-methyl-sulphinyl-3-bromo-anthraquinone. | Do. |
| 158 | 1.4.5-triamino-8-hydroxy-2-methyl-sulphinyl-3-chloro-anthraquinone. | Do. |
| 159 | 1.4.5-triamino-8-hydroxy-2-phenyl-sulphinyl-3-ethylthio-anthraquinone. | Do. |
| 160 | 1.4.5-triamino-8-hydroxy-2-methyl-sulphinyl-3-phenylthio-anthraquinone. | Do. |

EXAMPLE 161

22.2 parts flowers of sulphur are added at 15–20° C. to a mixture of 136 parts 65% oleum and 86 parts sulphuric acid monohydrate, the mixture stirred for 30 minutes at 15–20° C, and then diluted with 334 parts sulphuric acid monohydrate. 68.8 parts cyclic 5-nitro-2-phenoxy-anthraquinone-1.4-disulphonimide are now introduced at 15–20° C.; the mixture is stirred for 2 hours at 25–28° C., heated to 60° C. in 2 hours and then to 90° C. in 1 hour. 134 parts 85% sulphuric acid are then added, the mixture heated to 115° C., and after 5 minutes at 115° C. allowed to cool. It is then diluted with 200 parts water, filtered off from precipitated sulphur with suction and the solution introduced into 2000 parts ice water. After the reddish blue amorphous product has been filtered off with suction, washed with water and dried, 44.3 parts 1.4.5-triamino-8-hydroxy-2-phenoxy-anthraquinone (=89% of the theory) are obtained.

Dyed or printed according to the process of Example 1(b) or 1(c), the dye yields on polyethyleneterephthalate fibres clear blue shades which are distinguished by outstanding fastness to light, thermofixation, sublimation, rubbing and washing, with high dye yield and very good build.

The dyes which are obtained from cyclic 5-nitro-2-aryloxy-anthraquinone-1.4-disulphonimides or -1.4-disulphonamides according to Example 161, and their shades on polyethyleneterephthalate fibres, are given in the following table:

| Example | Dye mixture consisting of— | Shade |
|---|---|---|
| 162 | 1.4.5-triamino-8-hydroxy-2-(4'-chloro)-phenoxy-anthraquinone. | Blue. |
| 163 | 1.4.5-triamino-8-hydroxy-2-(3'-bromo)-phenoxy-anthraquinone. | |
| 164 | 1.4.5-triamino-8-hydroxy-2-(3'-fluoro)phenoxy-anthraquinone. | Do. |
| 165 | 1.4.5-triamino-8-hydroxy-2-(4'-methyl)-phenoxy-anthraquinone. | Do. |
| 166 | 1.4.5-triamino-8-hydroxy-2-(4'-t-butyl)-phenoxy-anthraquinone. | Do. |
| 167 | 1.4.5-triamino-8-hydroxy-2-(3'-trifluoro-methyl)-phenoxy-anthraquinone. | Do. |
| 168 | 1.4.5-triamino-8-hydroxy-2-(4'-methoxy-methyl)-phenoxy-anthraquinone. | Do. |
| 169 | 1.4.5-triamino-8-hydroxy-2-(4'-ethoxy-methyl)-phenoxy-anthraquinone. | Do. |
| 170 | 1.4.5-triamino-8-hydroxy-2-(4'-methoxy-ethyl)-phenoxy-anthraquinone. | Do. |
| 171 | 1.4.5-triamino-8-hydroxy-2-(4'-chloro-methyl)-phenoxy-anthraquinone. | Do. |
| 172 | 1.4.5-triamino-8-hydroxy-2-(4'-ethoxy-carbonyl-methyl)-phenoxy-anthraquinone. | Do. |
| 173 | 1.4.5-triamino-8-hydroxy-2-(3'-ethoxy-carbonyl)-phenoxy-anthraquinone. | Do. |
| 174 | 1.4.5-triamino-8-hydroxy-2-(4'-methoxy-carbonyl)-phenoxy-anthraquinone. | Do. |
| 175 | 1.4.5-triamino-8-hydroxy-2-(4'-dimethyl-amino)-phenoxy-anthraquinone. | Do. |
| 176 | 1.4.5-triamino-8-hydroxy-2-(2'.5'-dichloro)-phenoxy-anthraquinone. | Do. |
| 177 | 1.4.5-triamino-8-hydroxy-2-(2'.4'-dimethyl)-phenoxy-anthraquinone. | Do. |
| 178 | 1.4.5-triamino-8-hydroxy-2-β-naphthoxy-anthraquinone. | Do. |
| 179 | 1.4.5-triamino-8-hydroxy-2-α-naphthoxy-anthraquinone. | Do. |
| 180 | 1.4.5-triamino-8-hydroxy-2-(4'-methylthio)-phenoxy-anthraquinone. | Do. |
| 181 | 1.4.5-triamino-8-hydroxy-2-(4'-methylsulphonyl)-phenoxy-anthraquinone. | Do. |

EXAMPLE 182

75.3 parts cyclic 5-nitro-2-methoxy-anthraquinone-1.4-disulphonimide are reacted with sulphur in oleum according to Example 161 and after working up as described therein 1.4.5 - triamino-8-hydroxy-2-methoxy-anthraquinone is obtained as reddish blue powder. Dyed or printed according to the process of Example 1(b) or 1(c) the dye yields on polyethyleneterephthalate fibres clear blue shades which are distinguished by very good fastness to light, sublimation, thermofixation, rubbing and washing.

The dyes which are obtained from cyclic 5-nitro-alkoxy- or -aralkoxy-anthraquinone-1.4-disulphonimides or -1.4-disulphonamides according to Example 161, and their shades on polyethyleneterephthalate fibres, are given in the following table:

| Example | Dye mixture consisting of— | Shade |
|---|---|---|
| 183 | 1.4.5-triamino-8-hydroxy-2-ethoxy-anthraquinone | Blue. |
| 184 | 1.4.5-triamino-8-hydroxy-2-propoxy-anthraquinone | Do. |
| 185 | 1.4.5-triamino-8-hydroxy-2-isobutoxy-anthraquinone | Do. |
| 186 | 1.4.5-triamino-8-hydroxy-2-cyclohexyloxy-anthraquinone. | Do. |
| 187 | 1.4.5-triamino-8-hydroxy-2-β-methoxy-ethyleneoxy-anthraquinone. | Do. |
| 188 | 1.4.5-triamino-8-hydroxy-2-β-ethoxy-ethyleneoxy-anthraquinone. | Do. |
| 189 | 1.4.5-triamino-8-hydroxy-2-ω-methoxy-β-ethyleneoxy-ethyleneoxy-anthraquinone. | Do. |
| 190 | 1.4.5-triamino-8-hydroxy-2-ethoxycarbonylmethoxy-anthraquinone. | Do. |
| 191 | 1.4.5-triamino-8-hydroxy-2-β-methoxycarbonylene-oxy-anthraquinone. | Do. |
| 192 | 1.4.5-triamino-8-hydroxy-2-β-dimethylaminoethylene-oxy-anthraquinone. | Do. |
| 193 | 1.4.5-triamino-8-hydroxy-2-β-diethylamino-ethyleneoxy-anthraquinone. | Do. |
| 194 | 1.4.5-triamino-8-hydroxy-2-β-bis-(methoxyethyl)-aminoethyleneoxy-anthraquinone. | |
| 195 | 1.4.5-triamino-8-hydroxy-2-β-bis-(cyanoethyl)-aminoethyleneoxy-anthraquinone. | Do. |
| 196 | 1.4.5-triamino-8-hydroxy-2-benzyloxy-anthraquinone | Do. |
| 197 | 1.4.5-triamino-8-hydroxy-2-(4'-chloro)-benzyloxy-anthraquinone. | Do. |
| 198 | 1.4.5-triamino-8-hydroxy-2-α-naphthylmethoxy-anthraquinone. | Do. |
| 199 | 1.4.5-triamino-8-hydroxy-2-β-naphthylmethoxy-anthraquinone. | Do. |

EXAMPLE 200

81.5 parts cyclic 5-nitro-2.3-bis-(phenoxy)-anthraquinone-1.4-disulphonimide are reacted with sulphur in oleum according to Example 161 and after working up as described therein 1.4.5-triamino-8-hydroxy-2.3-bis-(phenoxy)-anthraquinone is obtained as blue powder. Dyed or printed according to the process of Example 1(b) or 1(c), the dye yields on polyethyleneterephthalate fibres blue shades which are distinguished by very good fastness to light, sublimation, thermofixation, rubbing and washing.

The dyes which are obtained from appropriately 2.3-disubstituted 5-nitro-anthraquinone 1.4-disulphonimides and -1.4-disulphonamides according to Example 161, and their shades on polyethyleneterephthalate fibres, are given in the following table:

| Example | Dye mixture consising of— | Shade. |
|---|---|---|
| 201 | 1.4.5-triamino-8-hydroxy-2.3-bis-(4'-methylphenoxy)-anthraquinone. | Blue. |
| 202 | 1.4.5-triamino-8-hydroxy-2-phenoxy-3-methoxy-anthraquinone. | Do. |
| 203 | 1.4.5-triamino-8-hydroxy-2.3-bis-(methoxy)-anthraquinone. | Do. |
| 204 | 1.4.5-triamino-8-hydroxy-2-phenoxy-3-phenylthio-anthraquinone. | Do. |
| 205 | 1.4.5-triamino-8-hydroxy-2-ethoxy-3-ethylthio-anthraquinone. | Do. |
| 206 | 1.4.5-triamino-8-hydroxy-2.3-bis-(methoxycarbonyl-methoxy)-anthraquinone. | Do. |
| 207 | 1.4.5-triamino-8-hydroxy-2-phenoxy-3-ethylsulphinyl-anthraquinone. | Do. |
| 208 | 1.4.5-triamino-8-hydroxy-2-methoxy-3-phenylsulphinyl-anthraquinone. | Do. |
| 209 | 1.4.5-triamino-8-hydroxy-2-β-methoxy-ethyleneoxy-3-methylsulphonyl-anthraquinone. | Do. |
| 210 | 1.4.5-triamino-8-hydroxy-2-methoxy-3-phenylsulphonyl-anthraquinone. | Do. |
| 211 | 1.4.5-triamino-8-hydroxy-2-phenoxy-3-bromo-anthraquinone. | Do. |
| 212 | 1.4.5-triamino-8-hydroxy-2-β-methoxy-ethyleneoxy-3-bromo-anthraquinone. | Do. |
| 213 | 1.4.5-triamino-8-hydroxy-2-phenoxy-3-chloro-anthraquinone. | Do. |
| 214 | 1.4.5-triamino-8-hydroxy-2-β-methoxy-ethyleneoxy-3-chloro-anthraquinone. | Do. |
| 215 | 1.4.5-triamino-8-hydroxy-2.3-bis-(β-methoxyethyl-eneoxy)-anthraquinone. | Do. |

What we claim is:
1. Dyes of the formula

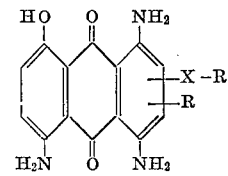

wherein

X stands for $SO_2$;

R for an alkyl group containing up to 6 carbon atoms which may be substituted by chlorine or bromine or lower alkoxy groups wherein R stands furthermore for benzyl, chlorobenzyl or naphthylmethyl and wherein R stands furthermore for a phenyl or naphthyl group or a phenyl group substituted by halogen, lower alkyl, lower alkoxy lower alkyl, carboxylic lower alkyl ester groups, dilower alkyl amino group the akyl groups of which may be substituted by lower alkoxy groups or cyano groups or wherein the phenyl may be substituted by lower alkyl mercapto groups or the trifluoromethyl group; and wherein R further may stand for methylcyclohexyl, cyanomethylphenyl, ethoxycarbonylmethylphenyl, phenoxyphenyl, aminophenyl, phenylaminophenyl, cyano ethyl, methoxy ethyleneoxy ethyl, dimethylamino ethyl, diethylamino ethyl, bis-methoxyethylamino ethyl, bis-cyanoethylamino ethyl, ethoxycarbonylmethyl, methoxycarbonylethyl;

R' represents hydrogen, halogen, OR", —SR"—, —SOR"—, or $SO_2R"$ and

R" represents a lower alkyl group which may be substituted by alkoxy groups and wherein R" represents furthermore phenyl and wherein R" represents furthermore a benzyl group.

2. 1.4.5 - triamino - 8 - hydroxy - 2 - phenylsulphonyl-anthraquinone.

3. 1.4.5 - triamino - 8 - hydroxy - 2 - (4'-chloro)-phenyl-sulphonyl-anthraquinone.

4. 1.4.5 - triamino - 8 - hydroxy - 2 - methylsulphonyl-anthraquinone.

5. 1.4.5 - triamino - 8 - hydroxy - 2 - ethylsulphonyl-anthraquinone.

References Cited

UNITED STATES PATENTS

| 3,165,516 | 1/1965 | Altermatt | 260—249 |
| 3,236,843 | 2/1966 | Straley et al. | 260—247.1 |
| 3,316,280 | 4/1967 | Vollmann et al. | 260—371X |
| 3,336,343 | 8/1967 | Ferrari | 260—380 |

FOREIGN PATENTS

| 735,938 | 6/1966 | Canada | 260—373 |
| 1,268,400 | 6/1961 | France | 260—380 |
| 964,058 | 5/1957 | Germany | 260—371 |

OTHER REFERENCES

Houben: "Oxydation in Saurer Lösung," in Das Anthraceme und die Anthrachinon, Leipzig, Germany: Georg Thieme Berlag, p. 322–328 (1929).

LORRAINE A. WEINBERGER, Primary Examiner

E. J. SKELLY, Assistant Examiner

U.S. Cl. X.R.

8—39, 40; 260—372; 376, 380

UNITED STATES PATENT OFFICE
CERTIFICATE OF CORRECTION

Patent No.   3,557,154                    Dated  January 19, 1971

Inventor(s)  RUTGER NEEFF, WILHELM GOHRBANDT, ROBERT KUTH ET

It is certified that error appears in the above-identified patent and that said Letters Patent are hereby corrected as shown below:

| Column | Line | Error |
| --- | --- | --- |
| 2 | 37 | "4-isopropyl-," should be ---3-isopropyl-,--- |
| 2 | 42 | "3-carboethoxy..." should be ---3-carbethoxy...---. |
| 3 | 10 | " -phenylthia)" should be --- -phenylthio)---. |
| 4 | 45 | "1,4" should be --- 1.4 ---. |
| 4 | 68 | "at" should be ---of---. |
| 6 | 6 | "dlmethyl" should be ---dimethyl---. |
| 6 | 75 | "phenylxulphonyl" should be ---phenylsulphonyl---. |
| 9 | Ex. 89 | "anthraquinon" should be ---anthraquinone---. |
| 10 | 11 | "desulphonamides" should be ---disulphonamides--- |

UNITED STATES PATENT OFFICE
CERTIFICATE OF CORRECTION

Page 2

Patent No. 3,557,154          Dated January 19, 1971

Inventor(s) RUTGER NEEFF, WILHELM GOHRABNDT, ROBERT KUTH ET

It is certified that error appears in the above-identified patent and that said Letters Patent are hereby corrected as shown below:

| Column | Line | Error |
|---|---|---|
| 11 | Ex. 132 | " methoxycarboxylmethylthio " should be ---methoxycarbonylmethylthio--- |
| 11 | 26 | " acording" should be ---according---. |
| 13 | Ex. 191 | " methoxycarbonyleneoxy " should be ---methoxycarbonylethyleneoxy --- |
| 13 | Ex. 207 | "Do." should be ---reddish blue-- |
| 13 | Ex. 211 | "Do." should be --- blue ---. |
| 14 | 6 | "-R " should be --- -R' ---. |

Signed and sealed this 19th day of October 1971.

(SEAL)
Attest:

EDWARD M. FLETCHER, JR.
Attesting Officer

ROBERT GOTTSCHALK
Acting Commissioner of Pa